US012763374B2

(12) United States Patent
Shimizu et al.

(10) Patent No.: US 12,763,374 B2
(45) Date of Patent: Oct. 13, 2026

(54) SOLID STATE BATTERY

(71) Applicant: Murata Manufacturing Co., Ltd., Nagaokakyo (JP)

(72) Inventors: Keisuke Shimizu, Nagaokakyo (JP); Takuro Hirakimoto, Nagaokakyo (JP); Sumito Shiina, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 593 days.

(21) Appl. No.: 18/147,464

(22) Filed: Dec. 28, 2022

(65) Prior Publication Data

US 2023/0163365 A1 May 25, 2023

Related U.S. Application Data

(63) Continuation of application No. PCT/JP2021/023937, filed on Jun. 24, 2021.

(30) Foreign Application Priority Data

Jul. 1, 2020 (JP) ................................ 2020-114378

(51) Int. Cl.

*H01M 10/0585* (2010.01)
*H01M 10/0525* (2010.01)
*H01M 10/42* (2006.01)
*H01M 50/55* (2021.01)

(52) U.S. Cl.

CPC ... *H01M 10/0585* (2013.01); *H01M 10/0525* (2013.01); *H01M 10/4235* (2013.01); *H01M 10/425* (2013.01); *H01M 50/55* (2021.01)

(58) Field of Classification Search

CPC ......... H01M 10/0585; H01M 10/0525; H01M 10/4235; H01M 10/425; H01M 50/55
USPC .............................................................. 429/7
See application file for complete search history.

(56) References Cited

U.S. PATENT DOCUMENTS 8,900,743 B2 * 12/2014 Kim .................. H01M 10/0436 429/126
9,793,522 B2 * 10/2017 Bhardwaj ............ H01M 50/119
11,588,173 B2 * 2/2023 Yano ................... H01M 50/256
11,764,395 B2 * 9/2023 Kato ................... H01M 10/056 429/162
11,804,638 B2 * 10/2023 Nishide ................ H01M 50/119
12,034,123 B2 * 7/2024 Maniwa .................. H01M 4/62
12,126,037 B2 * 10/2024 Kobayashi .......... H01M 50/195

(Continued)

FOREIGN PATENT DOCUMENTS

JP 2000243357 A 9/2000
JP 2001-321631 A 11/2001

(Continued)

OTHER PUBLICATIONS

International Search Report in PCT/JP2021/023937, mailed Sep. 14, 2021, 4 pages.

*Primary Examiner* — Brian K Talbot
(74) *Attorney, Agent, or Firm* — ArentFox Schiff LLP

(57) ABSTRACT

A solid state battery that includes: a solid state battery laminate having a stacked portion that includes a positive electrode layer, a negative electrode layer, and a solid electrolyte interposed between the positive electrode layer and the negative electrode layer; and a moisture absorbing film contacting at least a part of the solid state battery laminate and integrated with the solid state battery laminate.

17 Claims, 9 Drawing Sheets

(56) References Cited

U.S. PATENT DOCUMENTS

| | | | | |
|---|---|---|---|---|
| 12,424,610 | B2 * | 9/2025 | Yoshioka | H01M 50/548 |
| 2007/0207379 | A1 * | 9/2007 | Hatta | H01M 10/48 383/109 |
| 2008/0003493 | A1 * | 1/2008 | Bates | H01M 10/0562 429/185 |
| 2009/0233164 | A1 * | 9/2009 | Shimamura | H01M 50/193 429/210 |
| 2013/0164607 | A1 * | 6/2013 | Shih | H01M 10/052 29/730 |
| 2016/0049624 | A1 | 2/2016 | Bhardwaj et al. | |
| 2017/0301954 | A1 * | 10/2017 | Kwak | H01M 50/11 |
| 2018/0040860 | A1 * | 2/2018 | Young | H01M 50/129 |
| 2019/0097208 | A1 * | 3/2019 | Kawase | H01M 10/052 |
| 2019/0260070 | A1 | 8/2019 | Kishimoto et al. | |
| 2020/0106125 | A1 | 4/2020 | Yano et al. | |
| 2020/0350613 | A1 * | 11/2020 | Kato | H01M 10/0562 |
| 2021/0167471 | A1 | 6/2021 | Nishide et al. | |
| 2021/0359286 | A1 * | 11/2021 | Matsuki | H01M 50/103 |
| 2021/0367298 | A1 * | 11/2021 | Kobayashi | H01M 50/191 |
| 2021/0384550 | A1 * | 12/2021 | Kumagae | H01M 10/0436 |
| 2022/0006127 | A1 * | 1/2022 | Nakano | H01M 10/0525 |
| 2022/0013846 | A1 * | 1/2022 | Nishide | H01M 10/486 |
| 2023/0029225 | A1 * | 1/2023 | Gaben | H01M 50/526 |

FOREIGN PATENT DOCUMENTS

| | | | | |
|---|---|---|---|---|
| JP | 2005056672 | A | 3/2005 | |
| JP | 2005-116322 | A | 4/2005 | |
| JP | 2007103130 | A | 4/2007 | |
| JP | 2010519675 | A | 6/2010 | |
| JP | 2011151016 | A | 8/2011 | |
| JP | 2012-033434 | A | 2/2012 | |
| JP | 2015111532 | A | 6/2015 | |
| JP | 2015220102 | A | 12/2015 | |
| JP | 2016-051569 | A | 4/2016 | |
| JP | 2017523575 | A | 8/2017 | |
| WO | 2018/092484 | A1 | 5/2018 | |
| WO | 2018181288 | A1 | 10/2018 | |
| WO | WO-2020031424 | A1 * | 2/2020 | H01M 50/593 |
| WO | 2020203879 | A1 | 10/2020 | |
| WO | WO-2020202698 | A1 * | 10/2020 | H01M 50/186 |

* cited by examiner

SOLID STATE BATTERY

CROSS REFERENCE TO RELATED APPLICATIONS

The present application is a continuation of International application No. PCT/JP2021/023937, filed Jun. 24, 2021, which claims priority to Japanese Patent Application No. 2020-114378, filed Jul. 1, 2020, the entire contents of each of which are incorporated herein by reference.

FIELD OF THE INVENTION

The present invention relates to a solid state battery packaged to be suitable for board mounting.

BACKGROUND OF THE INVENTION

Conventionally, a secondary battery that can be repeatedly charged and discharged has been used for various applications. For example, secondary batteries are used as power sources of electronic devices such as smart phones and notebook computers.

In the secondary battery, a liquid electrolyte is generally used as a medium for ion transfer that contributes to charge and discharge. That is, a so-called electrolytic solution is used for the secondary battery. However, in such a secondary battery, safety is generally required from the viewpoint of preventing leakage of an electrolytic solution. Since an organic solvent or the like used for the electrolytic solution is a flammable substance, safety is required also in that respect.

Thus, a solid state battery configured using a solid electrolyte instead of an electrolytic solution has been studied.

Patent Document 1: Japanese Patent Application Laid-Open No. 2000-243357

SUMMARY OF THE INVENTION

The inventors of the present invention noticed that there were problems to be overcome with respect to conventional secondary batteries, and found need to take measures therefor. Specifically, the inventors of the present invention found that there were the following problems.

It is conceivable that a solid state battery is used by being mounted on a substrate such as a printed wiring board together with other electronic components, and in that case, a solid state battery suitable for mounting is required. On the other hand, the solid state battery needs to reliably take necessary measures against moisture in the air. This is because when moisture enters the inside of the solid state battery, there is a possibility that battery characteristics are deteriorated.

Here, Patent Document 1 discloses a secondary battery in which a positive electrode material and a negative electrode material electrically coupled to a current collector are stacked with a non-flowable electrolyte layer interposed therebetween, and a battery element containing an ionic metal component and a moisture absorbent are sealed with a synthetic resin housing. Patent Document 1 also discloses that the moisture absorbent is added to the inside of the housing or a synthetic resin layer of the housing.

However, in the secondary battery disclosed in Patent Document 1, moisture may enter from a gap between the moisture absorbent and the secondary battery, and it is hard to say that the secondary battery is a solid state battery in which the moisture entry is sufficiently prevented.

The present invention has been made in view of the above problems. That is, a main object of the present invention is to provide a technique of a solid state battery that reduces entry of moisture into the solid state battery.

Rather than addressing as merely extensions of conventional arts, the inventors of the present invention tried to solve the above problems by addressing from a new point of view. As a result, the invention of a solid state battery which has achieved the above-mentioned main purpose has been reached.

The present invention provides a packaged solid state battery, including: a solid state battery laminate having a stacked portion that includes a positive electrode layer, a negative electrode layer, and a solid electrolyte layer interposed between the positive electrode layer and the negative electrode layer; and a moisture absorbing film contacting at least a part of the solid state battery laminate and integrated with the solid state battery laminate.

The solid state battery according to the present invention can reduce entry of moisture into the solid state battery.

More specifically, the present invention is a packaged solid state battery mainly including a solid state battery laminate and a moisture absorbing film. In the packaged solid state battery of the present invention, since the moisture absorbing film comes into contact with at least a part of the solid state battery laminate and is closely contacted and integrated with the solid state battery laminate, there is no gap between the solid state battery laminate and the moisture absorbing film. Since moisture can be effectively absorbed by the moisture absorbing film, it is possible to reduce entry of moisture into the solid state battery.

Since the moisture absorbing film and the solid state battery laminate are closely contacted and integrated without a gap, an increase in volume of the solid state battery laminate can be suppressed. Therefore, the package can be downsized without reducing an energy density per volume of the solid state battery.

DETAILED DESCRIPTION OF THE INVENTION

Figure 1:
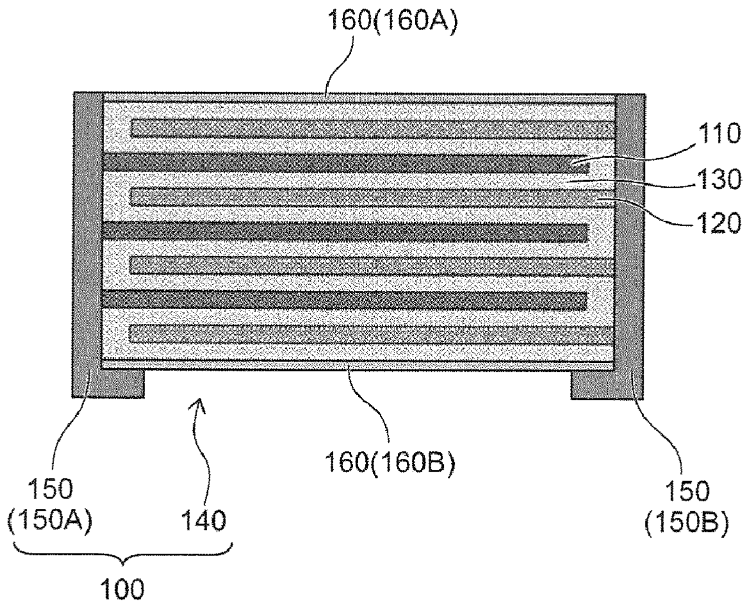
FIG. 1 is a side sectional view schematically showing an internal configuration of a solid state battery laminate.

Hereinafter, a solid state battery of the present invention will be described in detail. Although description will be made with reference to the drawings as necessary, illustrated contents are schematically and exemplarily shown wherein their appearances, their dimensional proportions, or the like are not necessarily real ones, and are merely for the purpose of making it easy to understand the present invention.

The term "packaged solid state battery" used in the present invention means a solid state battery protected from an external environment in a broad sense, and refers to a solid state battery in which water vapor from the external environment is prevented from entering the inside of the solid state battery in a narrow sense. The term "water vapor" as used herein refers to moisture typified by water vapor in the atmosphere, and in a preferred aspect, means moisture including not only water vapor in a gas form but also liquid water. In particular, the water in a liquid state may include dew condensation water in which water in a gaseous state is condensed. Preferably, the solid state battery of the present invention in which such moisture permeation is prevented is packaged so as to be suitable for substrate mounting, particularly packaged so as to be suitable for surface mounting. Thus, in a preferred aspect, the battery of the present invention is a SMD (Surface Mount Device) type battery. The term "water vapor" used in the present specification may also be referred to as "moisture" or the like.

The term "solid state battery" used in the present invention refers to, in a broad sense, a battery whose constituent elements are composed of solid and refers to, in a narrow sense, all solid state battery whose constituent elements (particularly preferably all constituent elements) are composed of solid. In a preferred embodiment, the solid state battery in the present invention is a stacked solid state battery configured such that layers constituting a battery constituent unit are stacked with each other, and preferably such layers are composed of a sintered body. The "solid state battery" includes not only a so-called "secondary battery" capable of repeating charging and discharging, but also a "primary battery" capable of only discharging. According to a preferred embodiment of the present invention, the "solid state battery" is a secondary battery. The "secondary battery" is not excessively limited by its name, and can include, for example, a power storage device. The term "sintering" used in the present invention is only required to achieve sintering at least in part.

The term "side section" used in the present specification is based on a form when viewed from a direction substantially perpendicular to the thickness direction based on the stacking direction of layers constituting the solid state battery (to put it briefly, a form when taken along a plane parallel to the thickness direction). The term "plane section" is based on a form when viewed from a direction substantially parallel to the thickness direction based on the stacking direction of layers constituting the solid state battery (to put it briefly, a form when taken along a plane perpendicular to the thickness direction). The terms "vertical direction" and "horizontal direction" directly or indirectly used here correspond respectively to the vertical direction and the horizontal direction in the drawing. Unless otherwise stated, the same numerals and symbols denote the same members or portions or the same contents. In a preferred embodiment, a vertical downward direction (that is, a direction in which gravity acts) corresponds to a "downward direction", and the opposite direction corresponds to an "upward direction".

The term "top surface" used in the present specification means a surface positioned on a relatively upper side among surfaces constituting the battery, and the term "bottom surface" means a surface positioned on a relatively lower side among the surfaces constituting the battery. Assuming a typical solid state battery having two opposing main surfaces, the term "top surface" used in the present specification refers to one of the main surfaces, and the term "bottom surface" refers to the other of the main surfaces.

Hereinafter, first, a basic configuration of the solid state battery of the present invention will be described. The configuration of the solid state battery described here is merely an example for understanding the invention, and does not limit the invention.

[Basic Configuration of Solid State Battery]

The solid state battery 1 includes a solid state battery laminate 100 (see FIGS. 1 and 2), and the solid state battery laminate 100 includes a stacked portion 140 including a battery constituent unit including a positive electrode layer 110, a negative electrode layer 120, and a solid electrolyte 130 at least interposed therebetween, and an external terminal 150 provided on a side surface of the stacked portion. The solid state battery laminate 100 is supported by a support substrate 10 (see FIG. 3A). Furthermore, the solid state battery 1 may include a covering insulating film 30 covering the solid state battery laminate 100, and a covering inorganic film 50 covering the covering insulating film 30.

In the stacked portion 140, each layer constituting the stacked portion is formed by firing, and thus the positive electrode layer 110, the negative electrode layer 120, the solid electrolyte 130, and the like may form a sintered layer. Preferably, the positive electrode layer, the negative electrode layer, and the solid electrolyte are fired integrally with each other, and therefore the stacked portion forms an integrally sintered body. In the present specification, a direction (vertical direction) in which the positive electrode layer and the negative electrode layer are stacked is referred to as a "stacking direction", and a direction intersecting the stacking direction is a horizontal direction in which the positive electrode layer and the negative electrode layer extend.

(Positive Electrode Layer and Negative Electrode Layer)

Figure 2:
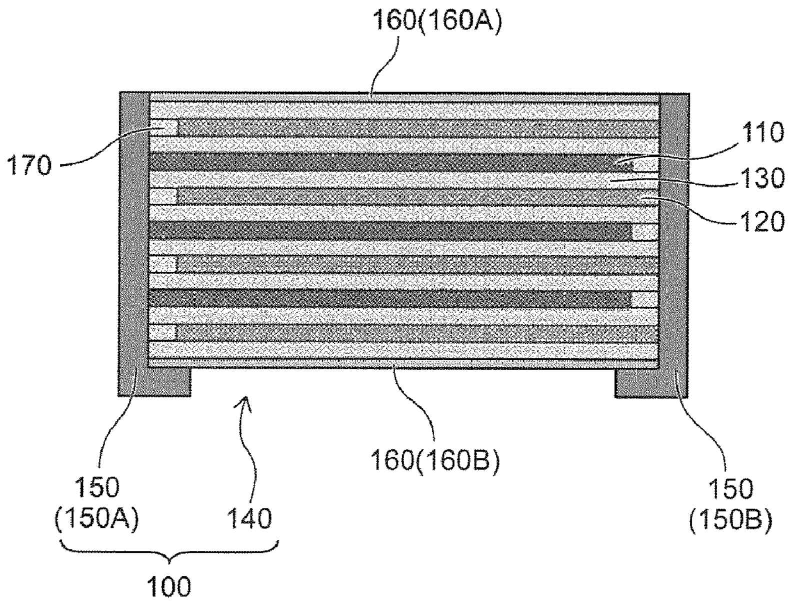
FIG. 2 is a side sectional view schematically showing another internal configuration of the solid state battery laminate.

The positive electrode layer 110 is an electrode layer containing at least a positive electrode active material. The positive electrode layer may further contain a solid electrolyte. In a preferred embodiment, the positive electrode layer is composed of a sintered body including at least the positive electrode active material particles and the solid electrolyte particles. On the other hand, the negative electrode layer 120 is an electrode layer containing at least a negative electrode active material. The negative electrode layer may further contain a solid electrolyte. In a preferred embodiment, the negative electrode layer is composed of a sintered body including at least the negative electrode active material particles and the solid electrolyte particles. Although FIGS. 1 and 2 show a configuration in which three positive electrode layers 110 and four negative electrode layers 120 are stacked, the number of stacked layers is not limited to this example, and several tens to several hundreds of layers may be stacked. The film thickness of the positive electrode layer or the negative electrode layer may be 5 μm to 60 μm, and preferably 8 μm to 50 μm. The film thickness may be 5 μm to 30 μm.

The positive electrode active material and the negative electrode active material are substances involved in transfer of electrons in the solid state battery. Ions move (are conducted) between the positive electrode layer and the negative electrode layer with the solid electrolyte therebetween to transfer electrons, so that the solid state battery is charged and discharged. The positive electrode layer and the negative electrode layer are particularly preferably layers capable of inserting and extracting lithium ions or sodium ions. That is, the solid state battery is preferably an all-solid-state secondary battery in which lithium ions or sodium ions move between the positive electrode layer and the negative electrode layer with the solid electrolyte interposed therebetween, thereby charging and discharging the battery.

(Positive Electrode Active Material)

Examples of the positive electrode active material contained in the positive electrode layer include at least one selected from the group consisting of a lithium-containing phosphate compound having a NASICON-type structure, a lithium-containing phosphate compound having an olivine-type structure, a lithium-containing layered oxide, and a lithium-containing oxide having a spinel-type structure. As an example of the lithium-containing phosphate compound having a NASICON-type structure, $Li_3V_2\ (PO_4)_3$ can be mentioned. As an example of the lithium-containing phosphate compound having an olivine-type structure, $Li_3Fe_2(PO_4)_3$, $LiFePO_4$, $LiMnPO_4$, and the like can be mentioned. As an example of the lithium-containing layered oxide, $LiCoO_2$, $LiCo_{1/3}Ni_{1/3}Mn_{1/3}O_2$, and the like can be mentioned. As an example of the lithium-containing oxide having a spinel-type structure, $LiMn_2O_4$, $LiNi_{0.5}Mn_{1.5}O_4$, and the like can be mentioned. The kind of the lithium compound is not particularly limited, and may be, for example, a lithium transition metal composite oxide and a lithium transition metal phosphate compound. The lithium transition metal composite oxide is a generic term for oxides containing lithium and one or two or more transition metal elements as constituent elements, and the lithium transition metal phosphate compound is a generic term for phosphoric acid compounds containing lithium and one or two or more transition metal elements as constituent. The type of transition metal element is not particularly limited and is, for example, cobalt (Co), nickel (Ni), manganese (Mn), or iron (Fe), or the like.

Examples of the positive electrode active material capable of inserting and extracting sodium ions include at least one selected from the group consisting of a sodium-containing phosphate compound having a NASICON-type structure, a sodium-containing phosphate compound having an olivine-type structure, a sodium-containing layered oxide, a sodium-containing oxide having a spinel-type structure and the like. For example, in the case of a sodium-containing phosphate compound, at least one selected from the group consisting of $Na_3V_2(PO_4)_3$, $NaCoFe_2(PO_4)_3$, $Na_2Ni_2Fe(PO_4)_3$, $Na_3Fe_2(PO_4)_3$, $Na_2FeP_2O_7$, $Na_4Fe_3\ (PO_4)_2\ (P_2O_7)$, and $NaFeO_2$ as a sodium-containing layered oxide can be mentioned.

In addition to this, the positive electrode active material may be, for example, an oxide, a disulfide, a chalcogenide, a conductive polymer, or the like. The oxide may be, for example, titanium oxide, vanadium oxide, manganese dioxide, or the like. The disulfide is, for example, titanium disulfide, molybdenum sulfide, or the like. The chalcogenide may be, for example, niobium selenide or the like. The conductive polymer may be, for example, disulfide, polypyrrole, polyaniline, polythiophene, polyparastylene, polyacetylene, polyacene, or the like.

(Negative Electrode Active Material)

Examples of the negative electrode active material contained in the negative electrode layer include at least one selected from the group consisting of an oxide containing at least one element selected from the group consisting of Ti, Si, Sn, Cr, Fe, Nb, and Mo, a carbon material such as graphite, a graphite-lithium compound, a lithium alloy, a lithium-containing phosphate compound having a NASICON-type structure, a lithium-containing phosphate compound having an olivine-type structure, and a lithium-containing oxide having a spinel-type structure. As an example of the lithium alloy, Li—Al alloys and the like can be mentioned. As an example of the lithium-containing phosphate compound having a NASICON-type structure, $Li_3V_2(PO_4)_3$, $LiTi_2(PO_4)_3$, and the like can be mentioned. As an example of the lithium-containing phosphate compound having an olivine-type structure, $Li_3Fe_2(PO_4)_3$, $LiCuPO_4$, and the like can be mentioned. As an example of the lithium-containing oxide having a spinel-type structure, $Li_4Ti_5O_{12}$ and the like can be mentioned.

Examples of the negative electrode active material capable of inserting and extracting sodium ions include at least one selected from the group consisting of a sodium-containing phosphate compound having a NASICON-type structure, a sodium-containing phosphate compound having an olivine-type structure, a sodium-containing oxide having a spinel-type structure, and the like.

The positive electrode layer and/or the negative electrode layer may contain a conductive material. The conductive material contained in the positive electrode layer and the negative electrode layer may be at least one material that contains a metal material such as silver, palladium, gold, platinum, aluminum, copper, or nickel, carbon, and the like.

In addition, the positive electrode layer and/or the negative electrode layer may contain a sintering aid. Examples of the sintering aid include at least one selected from the group consisting of aluminum oxide, lithium oxide, sodium oxide, potassium oxide, boron oxide, silicon oxide, bismuth oxide, and phosphorus oxide.

(Solid Electrolyte)

The solid electrolyte 130 is a material capable of conducting lithium ions. In particular, the solid electrolyte 130 constituting the battery constituent unit in the solid state battery forms a layer through which lithium ions can conduct between the positive electrode layer 110 and the negative electrode layer 120. Specific examples of the solid electrolyte include a lithium-containing phosphate compound having a NASICON structure, an oxide having a perovskite structure, an oxide having a garnet-type structure or a structure similar to the garnet-type structure, and an oxide glass ceramic-based lithium ion conductor. Examples of the lithium-containing phosphate acid compound having a nasicon structure include $Li_xM_y(PO_4)_3$ ($1 \le x \le 2$, $1 \le y \le 2$, M is at least one selected from the group consisting of Ti, Ge, Al, Ga and Zr). As an example of the lithium-containing phosphate compound having a nasicon structure, $Li_{1.2}Al_{0.2}Ti_{1.8}(PO_4)_3$ and the like can be mentioned, for example. As an example of the oxide having a perovskite structure, $La_{0.55}Li_{0.35}TiO_3$ and the like can be mentioned. As an example of the oxide having a garnet-type structure or a structure similar to the garnet-type structure, $Li_7La_3Zr_2O_{12}$ and the like can be mentioned. As the oxide glass ceramic-based lithium ion conductor, for example, a phosphate compound (LATP) containing lithium, aluminum, and titanium as constituent elements, and a phosphate compound (LAGP) containing lithium, aluminum, and germanium as constituent elements can be used. The solid electrolyte may be, for example, a glass electrolyte.

The solid electrolyte layer may contain a sintering aid. The sintering aid contained in the solid electrolyte layer may be selected from, for example, a material similar to the sintering aid that can be contained in the positive electrode layer/the negative electrode layer (Positive Electrode Current Collector Layer and Negative Electrode Current Collector Layer)

The positive electrode layer 110 and the negative electrode layer 120 may include a positive electrode current collector layer and a negative electrode current collector layer, respectively. Although the positive electrode current collector layer and the negative electrode current collector layer may have a form of a foil, the positive electrode current collector layer and the negative electrode current collector layer may have a form of a sintered body from the viewpoint of reducing a manufacturing cost of the solid state battery by integral firing and reducing the internal resistance of the solid state battery. When the positive electrode current collector layer and the negative electrode current collector layer have the form of the sintered body, the positive electrode current collector layer and the negative electrode current collector layer may be composed of a sintered body containing a conductive material and a sintering aid. The conductive material contained in the positive electrode current collector layer and the negative electrode current collector layer may be selected from, for example, materials similar to the conductive material that can be contained in the positive electrode layer and the negative electrode layer. The sintering aid contained in the positive electrode current collector layer and the negative electrode current collector layer may be selected from, for example, a material similar to the sintering aid that can be contained in the positive electrode layer/the negative electrode layer In the solid state battery, the positive electrode current collector layer and the negative electrode current collector layer are not essential, and a solid state battery in which such a positive electrode current collector layer and a negative electrode current collector layer are not provided is also conceivable. That is, the solid state battery in the present invention may be a solid state battery without a current collector layer.

(External Terminal)

A pair of external terminals 150 is provided on a side surface of the stacked portion 140 located in a direction intersecting the stacking direction. For example, an external terminal may be provided from the side surface to a bottom surface of the stacked portion 140. More specifically, a positive electrode-side external terminal 150A connected to the positive electrode layer 110 and a negative electrode-side external terminal 150B connected to the negative electrode layer 120 may be provided, the positive electrode-side external terminal 150A may be formed on one side surface (in the illustrated example, the left side), and the negative electrode-side external terminal 150B may be provided so as to face the positive electrode-side external terminal 150A (in the illustrated example, the right side). The pair of external terminals 150 preferably contains a material having high conductivity. Although not particularly limited, specific examples of the material of the external terminal include at least one selected from the group consisting of silver, gold, platinum, aluminum, copper, tin, and nickel.

(Inactive Substance Portion)

An inactive substance portion 170 may be provided between the positive electrode layer 110 and the external terminal 150B on the negative electrode side and between the negative electrode layer 120 and the external terminal 150A on the positive electrode side (see FIG. 2). The inactive substance portion 170 is provided to insulate between the positive electrode layer 110 and the external terminal 150B on the negative electrode side and between the negative electrode layer 120 and the external terminal 150A on the positive electrode side. That is, the inactive substance portion preferably has at least an electronic insulation property. As the material of the inactive substance portion, a material conventionally used as the "inactive substance" of the solid state battery may be used, and the inactive substance portion may be formed of, for example, a resin material, a glass material, and/or a ceramic material. From the viewpoint of producing by firing, the inactive substance portion may have the form of a sintered body. Examples thereof include at least one selected from the group consisting of soda lime glass, potash glass, borate glass, borosilicate glass, barium borosilicate-based glass, bismuth zinc borate glass, bismuth silicate glass, phosphate glass, aluminophosphate glass, and zinc phosphate glass. Although not particularly limited, examples of the ceramic material include at least one selected from the group consisting of aluminum oxide, boron nitride, silicon dioxide, silicon nitride, zirconium oxide, aluminum nitride, silicon carbide, and barium titanate. The inactive substance portion can also be referred to as a "margin portion" or a "negative portion" due to its form.

(Insulating Outermost Layer)

An insulating outermost layer 160 may be provided on the outermost side of the stacked portion 140. The insulating outermost layer 160 can be generally formed on the outermost side of the stacked portion 140, and used to electrically, physically, and/or chemically protect a solid state battery laminate. Particularly, the insulating outermost layer 160 includes an insulating outermost layer 160A on the top surface side of the solid state battery laminate 100 and an insulating outermost layer 160B on the bottom surface side of the solid state battery laminate 100. The material constituting the insulating outermost layer is preferably excellent in insulation property, durability and/or moisture resistance and environmentally safe, and may contain, for example, a resin material, a glass material and/or a ceramic material. Furthermore, the insulating outermost layer may have the form of a sintered body for production by integral firing, and may include a sintered body (for example, silicon oxide) containing a sintering aid that can be contained in the above-described positive electrode layer/negative electrode layer. The top surface and the bottom surface of the solid state battery laminate may be the stacked portion 140 without providing the insulating outermost layer 160.

(Covering Insulating Film)

Figure 3A:
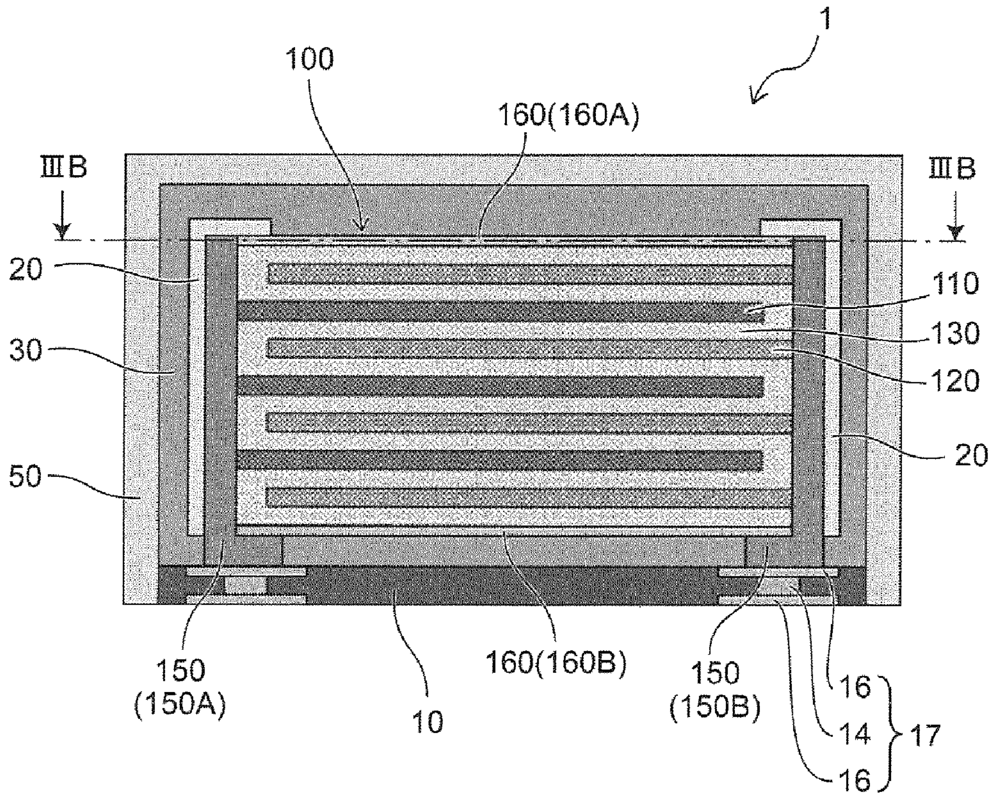
FIG. 3A is a side sectional view schematically showing a configuration of a solid state battery according to an embodiment of the present invention.
Figure 3B:
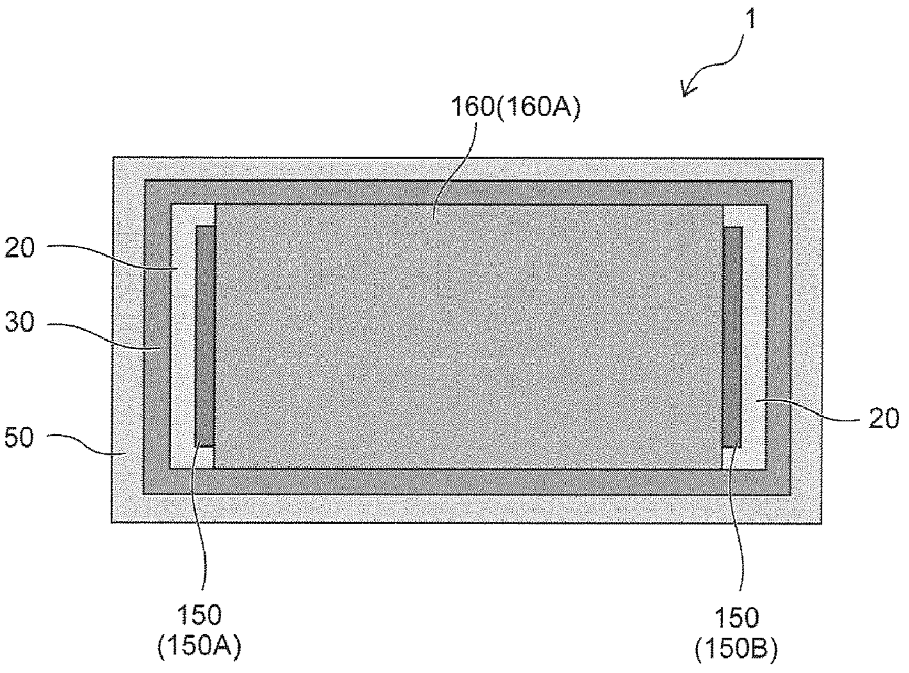
FIG. 3B is a sectional view (plane sectional view) taken along line IIIB-IIIB of FIG. 3A.

The solid state battery may be provided with a covering insulating film 30 provided so as to cover at least the solid state battery laminate 100. As shown in FIGS. 3A and 3B, the solid state battery laminate 100 provided on the support substrate 10 is largely wrapped by the covering insulating film 30 as a whole.

The covering insulating film 30 preferably corresponds to a resin film. That is, the covering insulating film 30 preferably contains a resin material. As can be seen from the aspects shown in FIGS. 3A and 3B, this means that the solid state battery laminate 100 provided on the support substrate 10 is sealed with the resin material of the covering insulating film 30. The covering insulating film 30 formed from such a resin material suitably contributes to reduction of entry of moisture in combination with the covering inorganic film 50.

The material of the covering insulating film may be any type as long as it exhibits insulating properties. For example, when the covering insulating film contains a resin, the resin may be either a thermosetting resin or a thermoplastic resin. Although not particularly limited, specific examples of the resin material of the covering insulating film include an epoxy-based resin, a silicone-based resin, and/or a liquid crystal polymer. Although it is merely an example, the thickness of the covering insulating film may be 30 μm to 1000 μm, and is, for example, 50 μm to 300 μm.

In the solid state battery, the covering insulating film is not essential, and a solid state battery in which the covering insulating film is not provided is also conceivable.

(Covering Inorganic Film)

The solid state battery may be further provided with the covering inorganic film 50 covering the covering insulating film 30. As shown in FIGS. 3A and 3B, the covering inorganic film 50 is positioned on the covering insulating film, and thus has a form of largely wrapping the solid state battery laminate on the support substrate as a whole together with the covering insulating film.

The covering inorganic film preferably has a thin film form. The material of the covering inorganic film is not particularly limited as long as it contributes to the inorganic film having a thin film form, and may be metal, glass, oxide ceramics, a mixture thereof, or the like. In a preferred embodiment, the covering inorganic film contains a metal component. That is, the covering inorganic film is preferably a metal thin film. Although it is merely an example, the thickness of such a covering inorganic film may be 0.1 μm to 100 μm, and is, for example, 1 μm to 50 μm.

In particular, depending on the production method, the covering inorganic film 50 may be a dry plating film. Such a dry plating film is a film obtained by a vapor phase method such as physical vapor deposition (PVD) or chemical vapor deposition (CVD), and has a very small thickness on the nano order or the micron order. Such a thin dry plating film contributes to more compact packaging.

The dry plating film may contain, for example, at least one metal component/metalloid component selected from the group consisting of aluminum (Al), nickel (Ni), palladium (Pd), silver (Ag), tin (Sn), gold (Au), copper (Cu), titanium (Ti), platinum (Pt), silicon (Si), SUS, and the like, an inorganic oxide, a glass component, and/or the like. Since the dry plating film containing such a component is chemically and/or thermally stable, a solid state battery having excellent chemical resistance, weather resistance, heat resistance, and/or the like and further improved long-term reliability can be provided.

In the solid state battery, the covering inorganic film is not essential, and a solid state battery in which the covering inorganic film is not provided is also conceivable.

(Support Substrate)

The support substrate 10 is a substrate provided to support the solid state battery laminate 100. The support substrate is positioned on one side that forms a main surface of the solid state battery so as to serve as the "support". The support substrate preferably has a thin plate-like form as a whole because of the "substrate".

The support substrate may be, for example, a resin substrate or a ceramic substrate, and is preferably a substrate having water resistance. In a preferred aspect, the support substrate is a ceramic substrate. That is, the support substrate contains ceramic, and the ceramic occupies a base material component of the substrate. The support substrate formed from ceramic contributes to prevention of water vapor transmission, and is thus a preferred substrate in terms of heat resistance and the like in substrate mounting. Such a ceramic substrate can be obtained through firing, and for example, can be obtained by firing a green sheet laminate. In this regard, the ceramic substrate may be, for example, an LTCC substrate (LTCC: Low Temperature Cofired Ceramics) or an HTCC substrate (HTCC: High Temperature Co-fired Ceramic). Although it is merely an example, the thickness of the support substrate may be 20 μm to 1000 μm, and is, for example, 100 μm to 300 μm.

The support substrate functions as a terminal substrate of the solid state battery laminate. That is, the solid state battery packaged in a form in which the substrate is interposed can be mounted on another secondary substrate such as a printed wiring board. For example, the solid state battery can be surface-mounted via a support substrate through solder reflow and the like. From the above, it can be said that the packaged solid state battery is an SMD type battery. In particular, when the terminal substrate includes a ceramic substrate, the solid state battery can be an SMD type battery having high heat resistance and being solder-mountable.

Because of the terminal substrate, wiring is preferably included, and in particular, it is preferable to include wiring 17 (see FIG. 3A) that electrically wires upper and lower surfaces or upper and lower surface layers. That is, a support substrate of a preferred aspect includes wiring that electrically wires upper and lower surfaces of the substrate, and is a terminal substrate for an external terminal of a packaged solid state battery.

The wiring 17 in the terminal substrate is not particularly limited, and may have any form as long as it contributes to electrical connection between the upper surface and the lower surface of the substrate. Since the form contributes to electrical connection, it can be said that the wiring 17 in the terminal substrate is a conductive portion of the substrate. Such a conductive portion of the substrate may have the form of a wiring layer, a via, a land, and/or the like. For example, in the aspect shown in FIG. 3A, the support substrate 10 is provided with a via 14 and/or a land 16. The "via" referred to herein refers to a member for electrically connecting the vertical direction of the support substrate, that is, the substrate thickness direction, and for example, a filled via or the like is preferable, and may be in the form of an inner via or the like. The term "land" used in the present specification refers to a terminal portion/connection portion (preferably a terminal portion/connection portion connected to the via) for electrical connection provided on an upper main surface and/or a lower main surface of the support substrate, and may be, for example, a corner land or a round land.

[Features of Solid State Battery of Present Invention]

The solid state battery of the present invention further includes a moisture absorbing film 20 in addition to the basic configuration of the solid state battery described above (see FIGS. 3A and 3B).

(Moisture Absorbing Film)

The moisture absorbing film 20 absorbs moisture contained in the solid state battery, comes into contact with at least a portion of the solid state battery laminate 100, and is closely contacted and integrated with the solid state battery laminate 100. Here, the expression "comes into contact with at least a portion and is closely contacted and integrated" in the present specification means a state of being in close contact with and integrated with substantially no gap.

The moisture absorbing film 20 contains a material having a moisture absorption effect of absorbing moisture with respect to at least one material selected from the group consisting of aluminum oxide, lithium oxide, sodium oxide, potassium oxide, boron oxide, silicon oxide, bismuth oxide, and phosphorus oxide, and is formed in a film shape by kneading these materials with, for example, a binder resin. That is, as a preferred aspect, the moisture absorbing film contains the material having the moisture absorption effect and the binder resin.

Examples of the material having the moisture absorption effect of absorbing moisture include at least one selected from the group consisting of synthetic zeolite, silica gel, phosphorus pentoxide, barium oxide, calcium oxide, and an organometallic structure. In particular, a moisture absorbing film containing synthetic zeolite is suitable because it is a material that has good temperature resistance and does not deliquesce when heat is generated by the operation of the solid state battery and the synthetic zeolite itself reaches a high temperature, and an absorbance rate per unit weight is good. Examples of the binder resin include an inorganic binder and/or a resin binder. Examples of the inorganic binder include glass binders. That is, the moisture absorbing film may contain a material having the moisture absorption effect and a glass binder.

Although it is merely an example, the thickness of the moisture absorbing film may be 1 μm to 50 μm from the viewpoint of preventing an increase in volume of the solid state battery, and is preferably, for example, 5 μm to 30 μm, or 5 μm to 15 μm. The thickness of the moisture absorbing film may be standardized to a certain thickness or may be non-uniform. The moisture absorbing film is a single layer film in the embodiment of FIGS. 3A and 3B, but may be a plurality of films of two or more layers. In the moisture absorbing film 20, the content of synthetic zeolite or silica gel as a preferable material is preferably 1 vol % to 85 vol % based on the entire moisture absorbing film although it will be described later. A reference time based on the entire moisture absorbing film may be a completion time of the solid state battery.

Here, in a conventional solid state battery laminate, since an electrode material such as the external terminal is exposed on the side surface located in the direction intersecting the stacking direction, there is a possibility that moisture enters from the external terminal and an interface between the external terminal and the laminate to cause deterioration of the solid state battery. Thus, in the embodiment of the present invention, the moisture absorbing film 20 is brought into contact with the pair of external terminals 150 provided facing each other in the solid state battery laminate, and is covered so as to be closely contacted and integrated with the external terminal on the side surface (FIGS. 3A and 3B). Here, the "side surface of the solid state battery laminate" used in the present specification means, for example, four surfaces perpendicular to the "top surface" and the "bottom surface" defined above among six surfaces constituting a substantially hexahedral battery in FIGS. 3A and 3B. As an aspect of covering the side surface, there is an aspect of covering at least a partial region of the side surface or an aspect of covering the entire region of the side surface. The shape of the solid state battery laminate is not limited to a substantially hexahedral shape, and the solid state battery laminate may have, for example, a cylindrical shape or the like. In the case of the cylindrical shape, an outer peripheral surface perpendicular to the "top surface" and the "bottom surface" is covered.

According to such an embodiment, in the embodiment of the present invention, the moisture absorbing film 20 and the external terminal 150 of the solid state battery laminate 100 are closely contacted and integrated and do not have a gap therebetween, and moisture is absorbed by the moisture absorbing film 20. In addition, in the solid state battery of the present invention, moisture is effectively absorbed by covering the side surface located in the direction intersecting the stacking direction, which is a location where deterioration is likely to occur when moisture enters, with the moisture absorbing film, and the entry of moisture into the solid state battery laminate can be reduced.

In addition, in the present embodiment, the moisture absorbing film 20 is provided so as to extend from the side surface of the external terminal 150 to the top surface which is an insulating outermost layer surface of the stacked portion 140 in a side sectional view of the solid state battery. That is, the moisture absorbing film is bent in the side sectional view. When the insulating outermost layer surface is not provided on the solid state battery laminate, the moisture absorbing film may be provided so as to extend from the side surface of the external terminal 150 to the top surface of the stacked portion 140. The moisture absorbing film 20 covers across an interface between the external terminal 150 and the stacked portion 140 in the side sectional view of the solid state battery. In this way, by covering the solid state battery laminate with the moisture absorbing film, entry of moisture from the top surface side of the solid state battery laminate or entry of moisture from the interface between the stacked portion and the external terminal can be effectively reduced, and entry of moisture into the solid state battery laminate can be further suppressed.

In addition, in the solid state battery of the present invention, by setting the thickness of the moisture absorbing film 20 in the solid state battery to about 1 μm to 50 μm, the increase in volume of the solid state battery can be suppressed. Therefore, it is possible to suppress a decrease in energy density per volume and to realize downsizing of the package.

Figure 4:
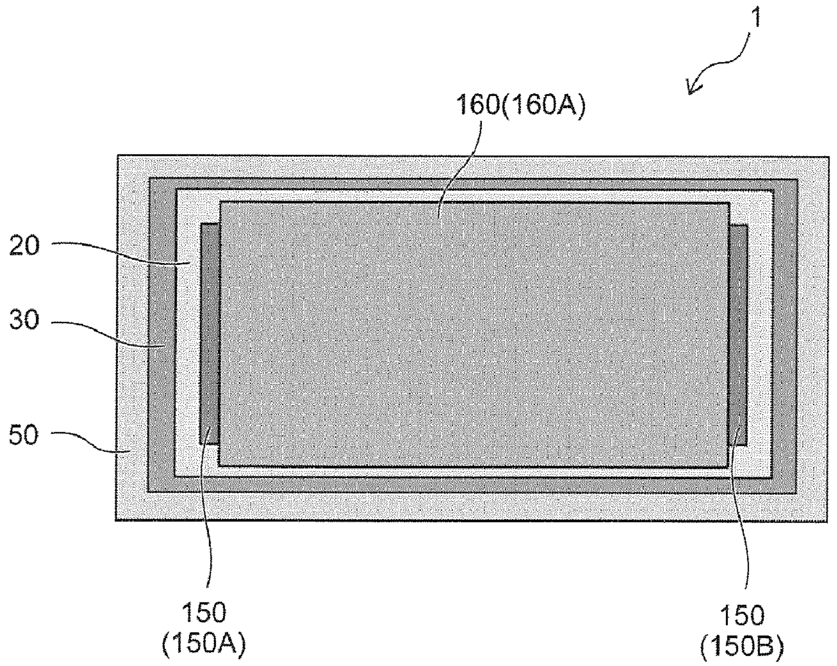
FIG. 4 is a plane sectional view schematically showing a configuration of a solid state battery according to another embodiment of the present invention.

Another preferred embodiment will be described with reference to FIG. 4. FIG. 4 is a plan sectional view schematically showing a configuration of a solid state battery according to another embodiment of the present invention. The moisture absorbing film 20 may be covered so as to come into contact with and be closely contacted and integrated with the side surface of the stacked portion 140 together with the external terminal 150. According to such an embodiment, since the moisture absorbing film is provided over the entire region of the side surface of the solid state battery laminate 100, it is possible to more effectively reduce entry of moisture into the solid state battery laminate.

In the present embodiment, the moisture absorbing film is provided over the entire region of the four side surfaces of the solid state battery laminate; however, instead of this aspect, moisture entering the inside of the solid state battery laminate may be reduced by providing the moisture absorbing film on at least one side surface.

Figure 5:
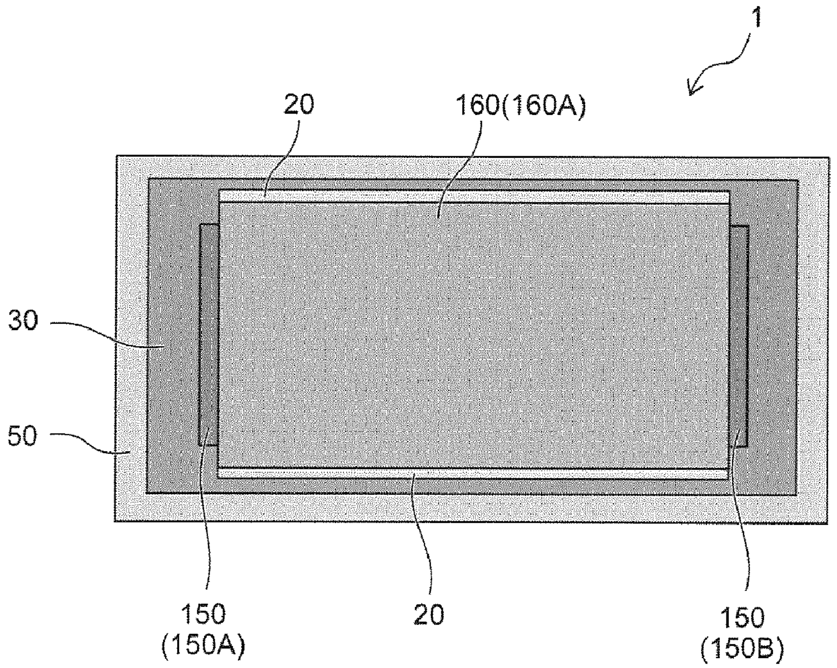
FIG. 5 is a plane sectional view schematically showing the configuration of the solid state battery according to another embodiment of the present invention.

Another preferred embodiment will be described with reference to FIG. 5. FIG. 5 is a plan sectional view schematically showing the configuration of the solid state battery according to another embodiment of the present invention. The moisture absorbing film 20 may be covered so as to come into contact with and be closely contacted and integrated with the side surface of the stacked portion 140 of the solid state battery laminate excluding the external terminal 150. According to such an embodiment as well, since most of the side surface of the solid state battery laminate is covered with the moisture absorbing film 20, entry of moisture into the solid state battery laminate can be reduced.

Figure 6:
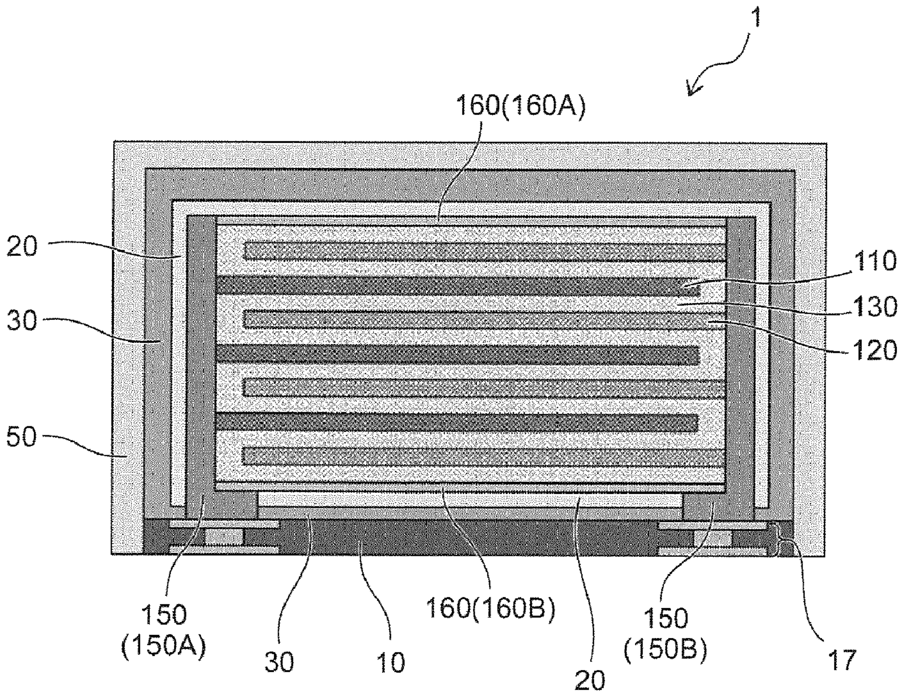
FIG. 6 is a side sectional view schematically showing the configuration of the solid state battery according to another embodiment of the present invention.

Another preferred embodiment will be described with reference to FIG. 6. FIG. 6 is a side sectional view schematically showing the configuration of the solid state battery according to another embodiment of the present invention. The moisture absorbing film 20 may be covered so as to come into contact with and be closely contacted and integrated with the entire region of the side surface of the solid state battery laminate 100 and the insulating outermost layer surface (top surface and bottom surface) of the insulating outermost layer 160 of the solid state battery laminate 100. More specifically, the entire surface of the solid state battery laminate 100 is covered with the moisture absorbing film 20. According to such an embodiment, in addition to entry of moisture from the side surface of the solid state battery laminate 100, unexpected entry of moisture from the stacking direction (vertical direction) of the solid state battery laminate 100 can be suppressed.

Figure 7:
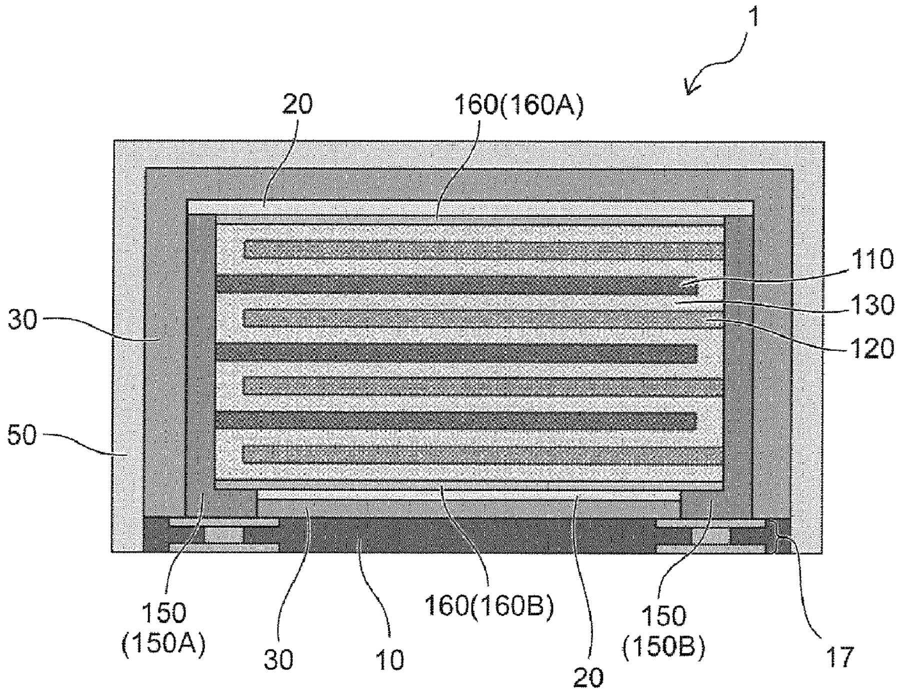
FIG. 7 is a side sectional view schematically showing the configuration of the solid state battery according to another embodiment of the present invention.

Another preferred embodiment will be described with reference to FIG. 7. FIG. 7 is a side sectional view schematically showing the configuration of the solid state battery according to another embodiment of the present invention. The moisture absorbing film 20 may be covered so as to come into contact with and be closely contacted and integrated with the insulating outermost layer surface (top surface and bottom surface) of the insulating outermost layer 160 of the stacked portion 140 in the solid state battery laminate. That is, in this embodiment, the moisture absorbing film is not provided on the side surface of the solid state battery laminate. According to such an embodiment, it is possible to reduce unexpected entry of moisture from the stacking direction (vertical direction).

Figure 8:
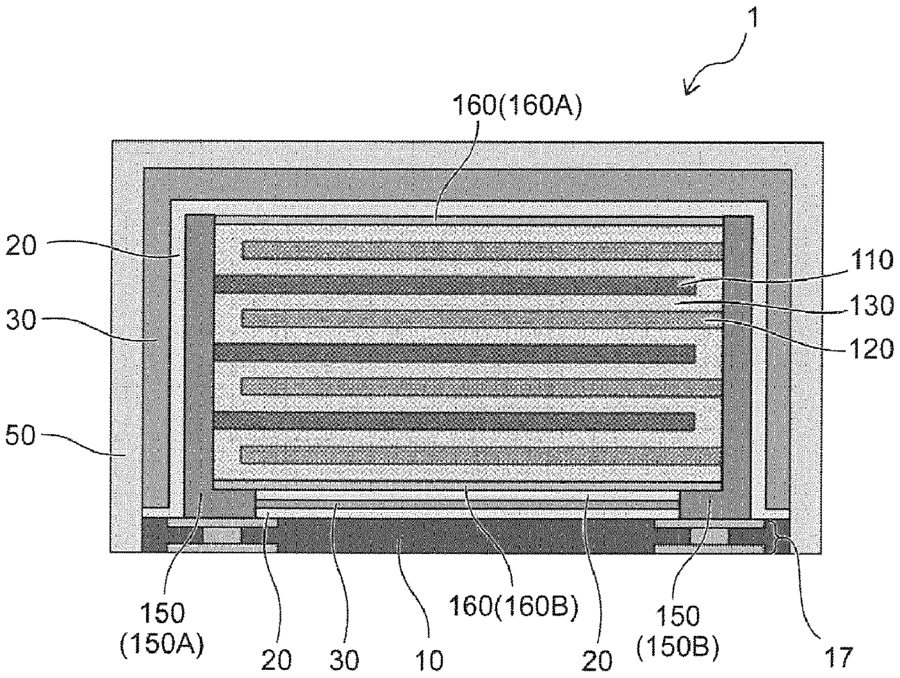
FIG. 8 is a side sectional view schematically showing the configuration of the solid state battery according to another embodiment of the present invention.

Another preferred embodiment will be described with reference to FIG. 8. FIG. 8 is a side sectional view schematically showing the configuration of the solid state battery according to another embodiment of the present invention. The moisture absorbing film 20 may be covered so as to come into contact with and be closely contacted and integrated with a support surface of the support substrate 10 supporting the solid state battery laminate 100 in addition to the insulating outermost layer surface (top surface and bottom surface) of the insulating outermost layer 160 of the solid state battery laminate 100 and the entire region of the side surface of the solid state battery laminate 100. According to such an embodiment, moisture can be absorbed by the support surface of the support substrate before the moisture reaches the solid state battery laminate 100 in addition to entry of moisture from the entire surface of the solid state battery laminate 100, and entry of moisture into the solid state battery can be further reduced.

Figure 9A:
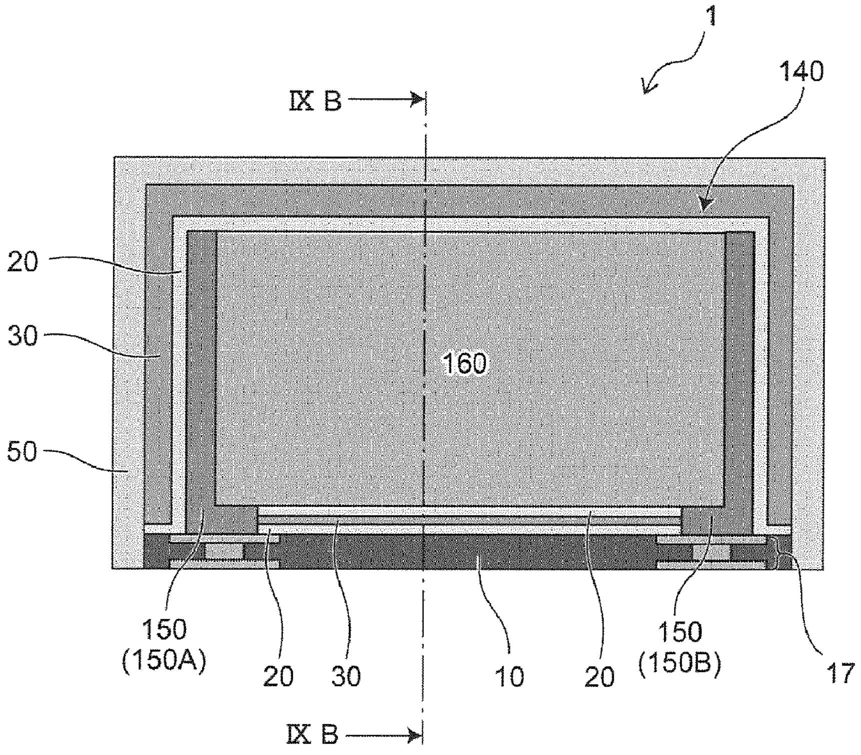
FIG. 9A is a side sectional view schematically showing the configuration of the solid state battery according to another embodiment of the present invention (sectional view taken along line IXA-IXA of FIG. 9B).
Figure 9B:
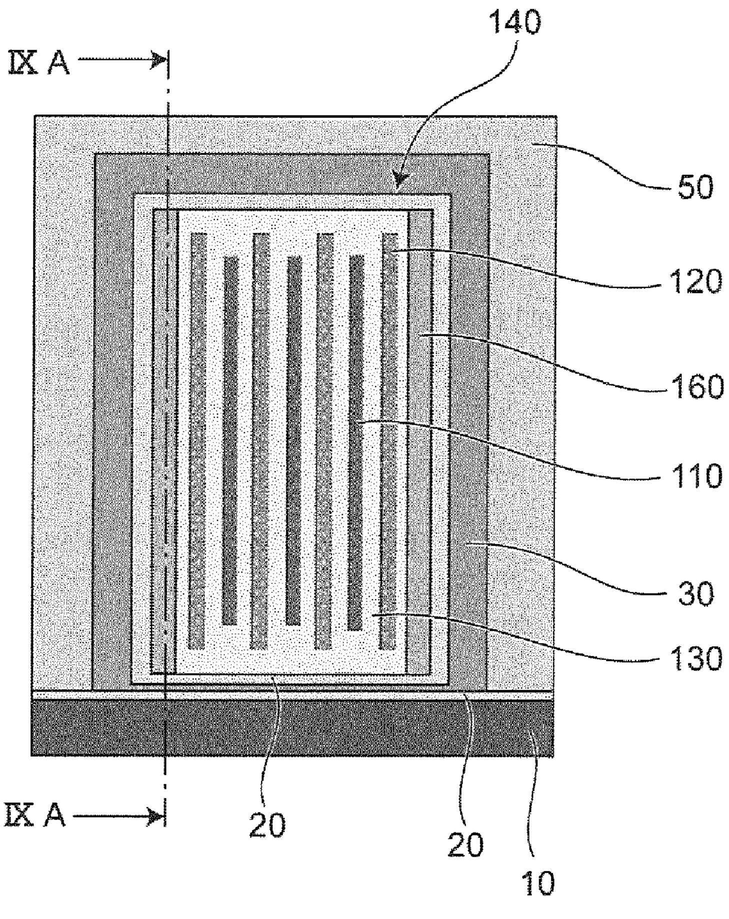
FIG. 9B is a sectional view taken along line IXB-IXB of FIG. 9A.

Another preferred embodiment will be described with reference to FIGS. 9A and 9B. FIG. 9A is a side sectional view schematically showing the configuration of the solid state battery according to another embodiment of the present invention (sectional view taken along line IXA-IXA of FIG. 9B), and FIG. 9B is a sectional view taken along line IXB-IXB of FIG. 9A. As in the present embodiment, the solid state battery laminate may be supported by the support substrate such that the stacking direction of the stacked portion 140 and the support surface of the support substrate 10 are parallel to each other (see FIG. 9B). In the present embodiment, the entire surface of the stacked portion 140 is covered with the moisture absorbing film 20 (see FIG. 9A); however, the moisture absorbing film may be provided so as to cover at least the interface between the stacked portion and the external terminal. According to such a configuration, since the interface between the stacked portion and the external terminal is covered with the moisture absorbing film and moisture is absorbed by the moisture absorbing film, entry of moisture into the solid state battery can be reduced. In addition, according to the present embodiment, if expansion occurs in the stacking direction due to charge and discharge or the like, deformation and the like of the support substrate due to the expansion can be reduced. The term "parallel" used in the present specification is not limited to a thoroughly parallel state, and includes a substantially parallel state.

[Method of Manufacturing Solid State Battery of Present Invention]

The object of the present invention can be obtained by preparing a solid state battery including a battery constituent unit having a positive electrode layer, a negative electrode layer, and a solid electrolyte between the electrodes, and then passing through a process of packaging the solid state battery.

Figure 10A:
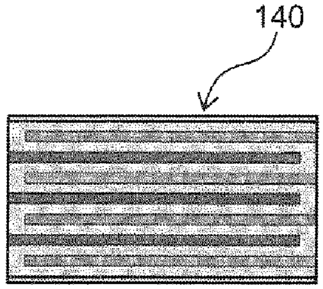
FIGS. 10A to 10E are process sectional views (side sectional views) showing a manufacturing flow of the solid state battery according to the embodiment of the present invention.
Figure 10B:
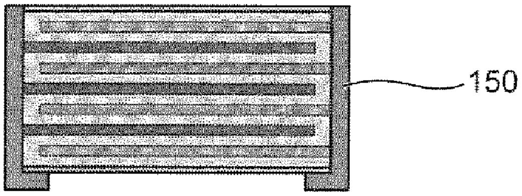
Figure 10C:
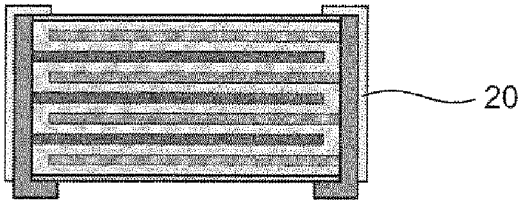
Figure 10D:
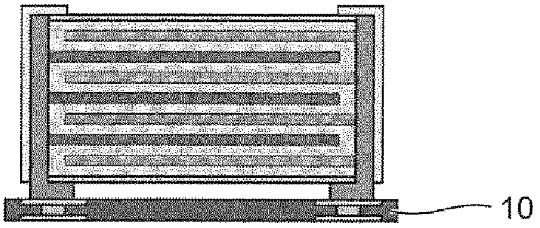
Figure 10E:
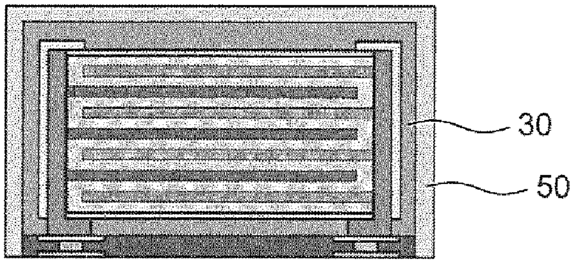
Figure 11A:
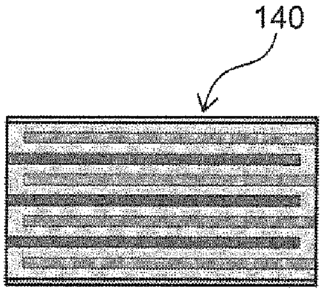
FIGS. 11A to 11E are process sectional views (side sectional views) showing a manufacturing flow of the solid state battery according to another embodiment of the present invention.
Figure 11B:
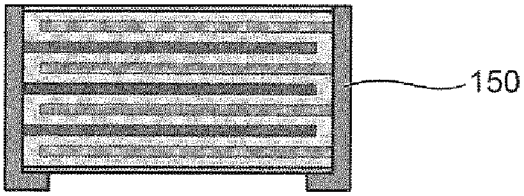
Figure 11C:
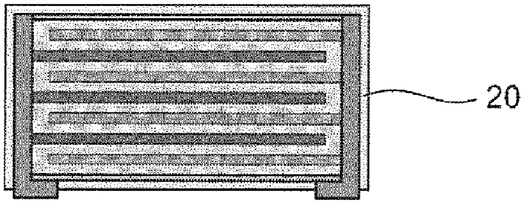
Figure 11D:
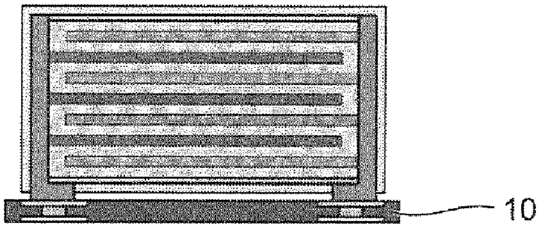
Figure 11E:
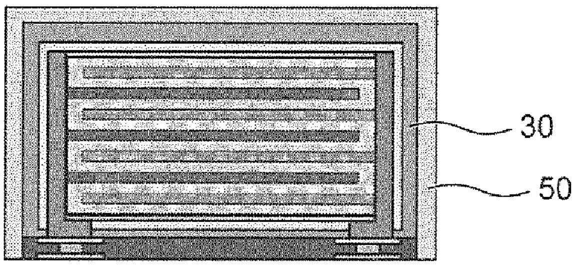
Figure 12A:
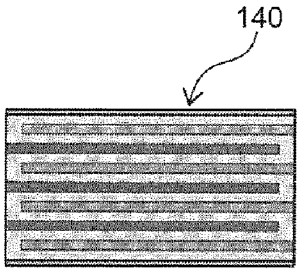
FIGS. 12A to 12E are process sectional views (side sectional views) showing a modified example of the manufacturing flow of the solid state battery according to the embodiment of the present invention.
Figure 12B:
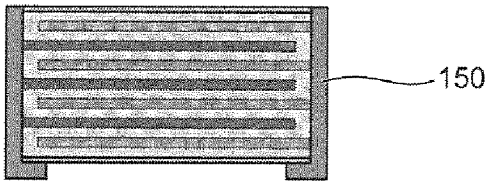
Figure 12C:
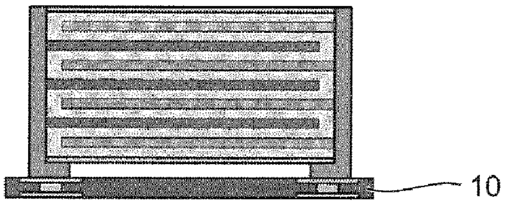
Figure 12D:
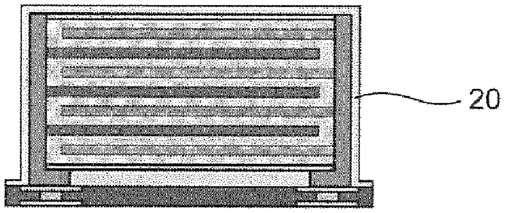
Figure 12E:
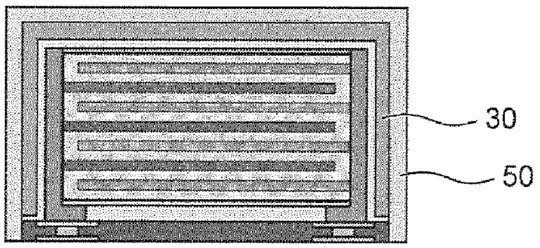

As shown in FIGS. 10A to 10E and FIGS. 11A to 11E, the solid state battery of the present invention is manufactured through a process including manufacturing of the stacked portion 140 (FIGS. 10A and 11A), formation of the external terminal 150 (FIGS. 10B and 11B), formation of the moisture absorbing film 20 (FIGS. 10C and 11C), fixation to the support substrate 10 (FIGS. 10D and 11D), and formation of the covering insulating film 30 and the covering inorganic film 50 (FIGS. 10E and 11E). Hereinafter, description will be made in order.

<Manufacturing of Stacked Portion>

The stacked portion 140 can be manufactured by a printing method such as a screen printing method, a green sheet method using a green sheet, or a method combining these methods. That is, the stacked portion itself may be prepared according to a conventional solid state battery manufacturing method (thus, as raw material substances such as a solid electrolyte, an organic binder, a solvent, an optional additive, a positive electrode active material, and a negative electrode active material described below, those used in the manufacturing of known solid state batteries may be used).

Hereinafter, for better understanding of the present invention, one manufacturing method will be exemplified and described, but the present invention is not limited to this method. In addition, the following time-dependent matter such as the order of description are merely for convenience of explanation and are not necessarily bound by them.

First, a slurry is prepared by mixing a solid electrolyte, an organic binder, a solvent, and an optional additive. Subsequently, a sheet having a thickness of about 10 μm after firing is obtained from the prepared slurry by sheet forming. Next, the positive electrode active material, the solid electrolyte, the conductive material, the organic binder, the solvent, and an optional additive are mixed to prepare a positive electrode paste. Similarly, the negative electrode active material, the solid electrolyte, the conductive material, the organic binder, the solvent, and an optional additive are mixed to prepare a negative electrode paste. Then, the positive electrode paste is printed on the sheet, and a current collecting layer and/or a negative layer is printed as necessary. Similarly, the negative electrode paste is printed on the sheet, and a current collecting layer and/or a negative layer is printed as necessary. Thereafter, the sheet on which the positive electrode paste is printed and the sheet on which the negative electrode paste is printed are alternately stacked to obtain a laminate. As for the insulating outermost layer (uppermost layer and/or lowermost layer) of the laminate, the insulating outermost layer may be an electrolyte layer, an insulating layer, or an electrode layer.

After the laminate is pressure-bonded and integrated, the laminate is cut into a predetermined size. The resulting cut laminate is subjected to degreasing and firing. Thus, a sintered laminate (stacked portion 140) is obtained. The laminate may be subjected to degreasing and firing before cutting, and then cut.

<Formation of External Terminal>

The external terminal on the positive electrode side can be formed by applying a conductive paste to the side surface of the stacked portion 140 from which the positive electrode is exposed. Similarly, the external terminal on the negative electrode side can be formed by applying a conductive paste to the side surface of the stacked portion 140 from which the negative electrode is exposed. When the external terminals on the positive electrode side and the negative electrode side are provided so as to extend to a lower surface of a sintered laminate, the external terminals can be connected to a mounting land in a small area in the next step, which is preferable (more specifically, the external terminal provided so as to extend to the lower surface of the sintered laminate has a folded portion on the lower surface, and such a folded portion can be electrically connected to the mounting land). The component of the external terminal may be selected from at least one selected from silver, gold, platinum, aluminum, copper, tin, and nickel.

The external terminals on the positive electrode side and the negative electrode side are not limited to be formed after sintering of the laminate, and may be formed before firing and subjected to simultaneous sintering.

<Formation of Moisture Absorbing Film>

The moisture absorbing film 20 is formed on the solid state battery laminate 100. First, at least one powder selected from the group consisting of synthetic zeolite, silica gel, phosphorus pentoxide, barium oxide, calcium oxide, and an organometallic structure is mixed with a binder resin into a solvent to prepare a paste solution. Then, the paste solution is dipped at a desired position (for example, the side surface of the solid state battery laminate on which the external terminal is formed, the side surface of the solid state battery laminate on which the external terminal is not formed, and the insulating outermost layer of the solid state battery laminate) where the moisture absorbing film is to be formed to form a moisture absorbing film. The film thickness of the moisture absorbing film is adjusted by the number of dips. When the moisture absorbing film is formed on the entire surface of the solid state battery laminate, the whole solid state battery laminate may be dipped in the paste solution (see FIG. 11C). The formation of the moisture absorbing film and the subsequent step are preferably performed in a dry atmosphere in order to prevent the moisture absorbing film from absorbing moisture during the step.

In the present embodiment, a method of forming a moisture absorbing film by dipping in the paste solution has been described; however, the present invention is not limited to this forming method, and for example, the moisture absorbing film may be formed by spray-coating the paste solution.

<Fixation to Support Substrate>

As the support substrate, a support substrate provided with a via and/or a land is used so as to be surface-mountable on a secondary substrate. For example, the support substrate can be obtained by stacking and firing a plurality of green sheets. This is particularly true when the support substrate is a ceramic substrate. The preparation of the support substrate can be performed, for example, in accordance with the preparation of the LTCC substrate. The via and/or the land is manufactured by, for example, a method of forming a hole (diameter size: about 50 μm to 200 μm) by a punch press, a carbon dioxide laser, or the like and filling the hole with a conductive paste material, or a method using a printing method.

After the support substrate 10 is manufactured, the solid state battery laminate 100 is disposed on the support substrate 10 so that the conductive portion of the support substrate 10 and the external terminal 150 of the solid state battery laminate 100 are electrically connected to each other. Then, the conductive paste may be provided on the support substrate 10 so that the conductive portion of the support substrate 10 and the external terminal 150 of the solid state battery laminate 100 are electrically connected to each other. As the conductive paste, in addition to an Ag conductive paste, a conductive paste that does not require washing, such as a flux, after formation, such as a nano paste, an alloy-based paste, or a brazing material, can be used.

<Formation of Covering Insulating Film and Covering Inorganic Film>

Subsequently, the covering insulating film 30 is formed so as to cover the solid state battery laminate 100 on the support substrate 10. Thus, a raw material of the covering insulating film 30 is provided so that the solid state battery laminate 100 on the support substrate 10 is covered as a whole. When the covering insulating film 30 is formed from a resin material, a resin precursor is provided on the support substrate 10 and, for example, cured to mold the covering insulating film 30. In a preferred aspect, the covering insulating film 30 may be molded by pressurization with a mold. Although it is merely an example, the covering insulating film 30 that seals the solid state battery laminate 100 on the support substrate 10 may be molded through compression molding. In the case of a resin material generally used in a mold, the form of the raw material of the covering insulating film may be granular, and the type thereof may be thermoplastic. Such molding is not limited to die molding, and may be performed through polishing, laser processing, and/or chemical treatment.

Here, when the covering insulating film 30 formed from a resin material is cured, the covering insulating film 30 shrinks, and there is a possibility that stress generated by the shrinkage has some influence on the solid state battery laminate 100. However, in the present embodiment, the moisture absorbing film 20 is formed on the solid state battery laminate 100 before the covering insulating film 30 is formed. Thus, if shrinkage stress occurs when the covering insulating film 30 is cured, the stress can be relaxed by the moisture absorbing film 20, and the influence on the solid state battery laminate 100 can be reduced.

Next, the covering inorganic film 50 is formed. For the covering inorganic film 50, for example, dry plating may be performed, and a dry plating film may be used as the covering inorganic film. More specifically, dry plating is performed to form the covering inorganic film 50 on an exposed surface other than a bottom surface of a covering precursor (that is, other than the bottom surface of the support substrate). In a preferred aspect, sputtering is performed to form a sputtered film on an exposed outer surface other than the bottom surface of the covering precursor.

Through the above steps, the packaged solid state battery according to the present invention can be finally obtained.

[Modified Example of Method of Manufacturing Solid State Battery of Present Invention]

As a modified example of the process of the above-described method of manufacturing a solid state battery, as shown in FIGS. 12A to 12E, the moisture absorbing film may be formed after being fixed to the support substrate. Specifically, the solid state battery laminate 100 fixed to the support substrate 10 may be dipped in the paste solution to manufacture the solid state battery including the moisture absorbing film 20. According to such a manufacturing method, since the moisture absorbing film is formed on the support substrate together with the solid state battery laminate, entry of moisture into the solid state battery can be more reliably reduced.

EXAMPLES

Examples related to the present invention will be described.

The solid state batteries of Examples 1 to 10 and Comparative Example described below were subjected to a demonstration test.

Example 1

Solid state battery: solid state battery shown in FIGS. 3A and 3B

Moisture absorbing material type: synthetic zeolite (ZEOLUM (registered trademark) A-5 from Tosoh Corporation)

Volume fraction of moisture absorbing material: 1% by weight based on the entire moisture absorbing film

Example 2

Solid state battery: solid state battery shown in FIGS. 3A and 3B

Moisture absorbing material type: synthetic zeolite

Volume fraction of moisture absorbing material: 20% by weight based on the entire moisture absorbing film

Example 3

Solid state battery: solid state battery shown in FIGS. 3A and 3B

Moisture absorbing material type: synthetic zeolite

Volume fraction of moisture absorbing material: 40% by weight based on the entire moisture absorbing film

Example 4

Solid state battery: solid state battery shown in FIGS. 3A and 3B

Moisture absorbing material type: synthetic zeolite

Volume fraction of moisture absorbing material: 80% by weight based on the entire moisture absorbing film

Example 5

Solid state battery: solid state battery shown in FIGS. 3A and 3B

Moisture absorbing material type: silica gel (TOYOTA Silica Gel Type A from TOYOTAKAKO Co., ltd.)

Volume fraction of moisture absorbing material: 40% by weight based on the entire moisture absorbing film

Example 6

Solid state battery: solid state battery shown in FIG. 4

Moisture absorbing material type: synthetic zeolite

Volume fraction of moisture absorbing material: 40% by weight based on the entire moisture absorbing film

Example 7

Solid state battery: solid state battery shown in FIG. 5

Moisture absorbing material type: synthetic zeolite

Volume fraction of moisture absorbing material: 40% by weight based on the entire moisture absorbing film

Example 8

Solid state battery: solid state battery shown in FIG. 6

Moisture absorbing material type: synthetic zeolite

Volume fraction of moisture absorbing material: 40% by weight based on the entire moisture absorbing film

Example 9

Solid state battery: solid state battery shown in FIG. 7

Moisture absorbing material type: synthetic zeolite

Volume fraction of moisture absorbing material: 40% by weight based on the entire moisture absorbing film

Example 10

Solid state battery: solid state battery shown in FIG.

Moisture absorbing material type: synthetic zeolite

Volume fraction of moisture absorbing material: 40% by weight based on the entire moisture absorbing film

Comparative Example

Solid state battery: conventionally known solid state battery provided with no moisture absorbing film As the contents of the demonstration test, for the solid state batteries of Examples 1 to 10 and Comparative Example, the solid state battery in which the covering inorganic film 50 was not formed was stored at 23° C. under an environment of a relative humidity of 20% (dew point: about 0° C.) for 1 week, and a rate of change between a discharge capacity change after storage and a discharge capacity change before storage was confirmed. For the calculation of the discharge capacity change, a method of checking the discharge capacity change when the battery is charged up to 4.2 V and then discharged up to 2.0 V by a charge and discharge device was adopted. The above demonstration test was performed on the solid state battery not provided with the covering inorganic film in order to perform the test in a state in which moisture relatively easily enters the solid state battery. The results of the demonstration test are shown in Table 1 below.

TABLE 1

| | Moisture absorbing material type | Volume fraction of moisture absorbing material (vol %) | Moisture absorbing material formation area | Determination |
|---|---|---|---|---|
| Example 1 | Synthetic zeolite | 1 | External terminal | ○ |
| Example 2 | Synthetic zeolite | 20 | External terminal | ○ |
| Example 3 | Synthetic zeolite | 40 | External terminal | ○ |
| Example 4 | Synthetic zeolite | 80 | External terminal | ○ |
| Example 5 | Silica gel | 40 | External terminal | ○ |
| Example 6 | Synthetic zeolite | 40 | Entire region of side surface including external terminal | ○ |
| Example 7 | Synthetic zeolite | 40 | Side surface excluding external terminal | ○ |
| Example 8 | Synthetic zeolite | 40 | Entire region of side surface including external terminal + insulating outermost layer | ○ |
| Example 9 | Synthetic zeolite | 40 | Only insulating outermost layer | ○ |
| Example 10 | Synthetic zeolite | 40 | Entire region of side surface including external terminal + insulating outermost layer + support surface | ⊙ |
| Comparative Example | None | — | — | X |

As a result of confirming a rate of change in the discharge capacity of the solid state batteries of Examples 1 to 10, since the rate of change in the discharge capacity was better than the rate of change in the discharge capacity of the solid state battery of Comparative Example, the content of the synthetic zeolite or silica gel in the moisture absorbing film was preferably 1 vol % to 85 vol % based on the entire moisture absorbing film. In particular, the rate of change in the discharge capacity of the solid state battery of Example 10 was small and very good. The upper limit of the content of the moisture absorbing material is set to 85 vol % since the moisture absorbing film contains a resin binder and the like; however, as long as a film can be formed, the content of a resin binder and the like may be reduced, and the content of the moisture absorbing material may be 85 vol % or more.

It should be noted that embodiments disclosed herein are by way of illustration in all respects and not a basis for a restrictive interpretation. Therefore, the technical scope of the present invention is not construed only by the above-described embodiments, but defined based on the recitation of claims and includes all modifications equivalent in meaning and scope to the claims. For example, the solid state battery is not limited to a substantially hexahedral shape, and may have a polyhedral shape, a cylindrical shape, or a spherical shape.

The packaged solid state battery of the present invention can be used in various fields in which battery use or electricity storage is assumed. Although it is merely an example, the packaged solid state battery of the present invention can be used in the electronics packaging field. The present invention can be used in electricity, information and communication fields where mobile equipment and the like are used (e.g., electrical/electronic equipment fields or mobile device fields including mobile phones, smart phones, laptop computers, digital cameras, activity meters, arm computers, electronic papers, and small electronic devices such as RFID tags, card type electronic money, and smartwatches), domestic and small industrial applications (e.g., the fields such as electric tools, golf carts, domestic robots, caregiving robots, and industrial robots), large industrial applications (e.g., the fields such as forklifts, elevators, and harbor cranes), transportation system fields (e.g., the fields such as hybrid vehicles, electric vehicles, buses, trains, electric assisted bicycles, and two-wheeled electric vehicles), electric power system applications (e.g., the fields such as various power generation systems, load conditioners, smart grids, and home-installation type power storage systems), medical applications (medical equipment fields such as earphone hearing aids), pharmaceutical applications (the fields such as dose management systems), IoT fields, and space and deep sea applications (e.g., the fields such as spacecraft and research submarines).

DESCRIPTION OF REFERENCE SYMBOLS

1: Solid state battery
10: Support substrate
14: Via
16: Land
17: Wire
20: Moisture absorbing film
30: Covering insulating film
50: Covering inorganic film
100: Solid state battery laminate
110: Positive electrode layer
120: Negative electrode layer
130: Solid electrolyte
140: Stacked portion
150: External terminal
150A: External terminal on positive electrode side
150B: External terminal on negative electrode side
160: Insulating outermost layer
160A: Top surface of insulating outermost layer
160B: Bottom surface of insulating outermost layer
170: Inactive substance portion

The invention claimed is:

1. A solid state battery, comprising:

a solid state battery laminate having a stacked portion that includes a positive electrode layer, a negative electrode layer, and a solid electrolyte layer interposed between the positive electrode layer and the negative electrode layer;

an external terminal on a side surface of the stacked portion in a direction intersecting a stacking direction of the positive electrode layer, the negative electrode layer, and the solid electrolyte layer;

a moisture absorbing film on at least a part of a surface of the external terminal; and an insulating film covering the laminate, at least part of the external terminal, and the moisture-absorbing film, wherein the moisture absorbing film is positioned between the insulating film and the external terminal.

2. The solid state battery according to claim 1, wherein the moisture absorbing film extends from a surface of the external terminal to the stacked portion in a side sectional view of the solid state battery.

3. The solid state battery according to claim 1, further comprising a support substrate supporting the solid state battery laminate, wherein the moisture absorbing film covers a support surface of the support substrate that supports the solid state battery laminate.

4. The solid state battery according to claim 1, further comprising a support substrate supporting the solid state battery laminate, wherein a support surface of the support substrate and a stacking direction of the solid state battery laminate are parallel to each other.

5. The solid state battery according to claim 3, wherein the support substrate includes wiring that electrically wires an outermost surface of the substrate to the external terminal.

6. The solid state battery according to claim 3, wherein the support substrate includes a wiring board having an inner via hole.

7. The solid state battery according to claim 1, wherein the moisture absorbing film includes at least one selected from the group consisting of synthetic zeolite, silica gel, phosphorus pentoxide, barium oxide, calcium oxide, and an organometallic structure.

8. The solid state battery according to claim 7, wherein the moisture absorbing film includes at least the synthetic zeolite or silica gel, and a content of the synthetic zeolite and/or the silica gel in the moisture absorbing film is 1 vol % to 85 vol % based on an entirety of the moisture absorbing film.

9. The solid state battery according to claim 1, wherein the moisture absorbing film has a thickness of 1 μm to 50 μm.

10. The solid state battery according to claim 1, wherein the solid state battery is constructed to be surface-mounted.

11. The solid state battery according to claim 1, wherein the stacked portion is a sintered body.

12. The solid state battery according to claim 1, wherein the positive electrode layer and the negative electrode layer are layers constructed to insert and extract lithium ions.

13. The solid state battery according to claim 1, wherein the moisture absorbing film covers a portion of an outer side surface of the external terminal and a top portion of the solid state battery laminate.

14. The solid state battery according to claim 1, further comprising an insulating outermost layer that covers an outermost side of the stacked portion of the solid state battery laminate in the stacking direction.

15. The solid state battery according to claim 14, wherein the moisture absorbing film covers a portion of outer side surface of the external terminal and a top portion of the insulating outermost layer that is opposite the stacked portion of the solid state battery laminate.

16. A solid state battery, comprising:

a solid state battery laminate having a stacked portion that includes a positive electrode layer, a negative electrode layer, and a solid electrolyte layer interposed between the positive electrode layer and the negative electrode layer; and a moisture absorbing film contacting at least a part of the solid state battery laminate and integrated with the solid state battery laminate, wherein the moisture absorbing film covers a side surface of the stacked portion located in a direction intersecting a stacking direction of the positive electrode layer, the negative electrode layer, and the solid electrolyte layer, wherein the solid state battery laminate further includes an external terminal on the side surface of the stacked portion in the direction intersecting the stacking direction, and the moisture absorbing film covers the external terminal, such that the moisture absorbing film is disposed outside of the external terminal, and wherein the moisture absorbing film extends in the direction intersecting the stacking direction to cover an interface between the external terminal and the stacked portion in a side sectional view of the solid state battery.

17. The solid state battery according to claim 16, wherein the moisture absorbing film covers a portion of an outer side surface of the external terminal and a top portion of the solid state battery laminate.

* * * * *